(No Model.)
W. H. BROWN.
APPARATUS FOR TRANSMITTING FERTILIZERS.
No. 419,242. Patented Jan. 14, 1890.
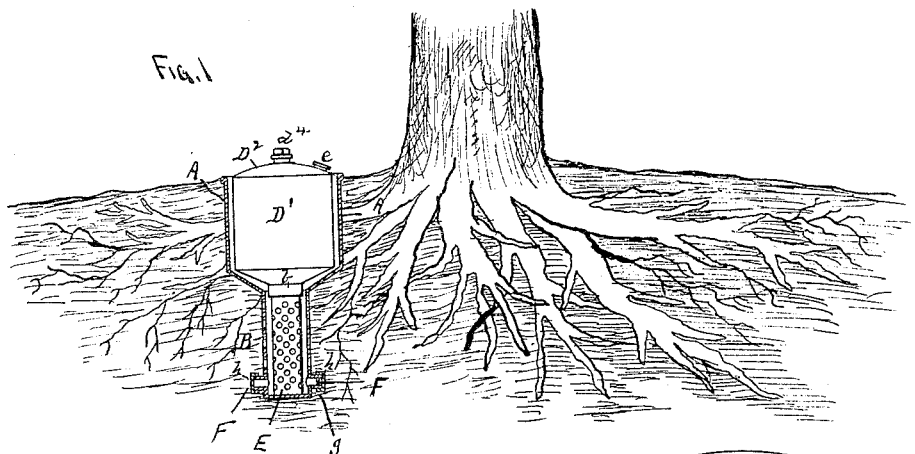
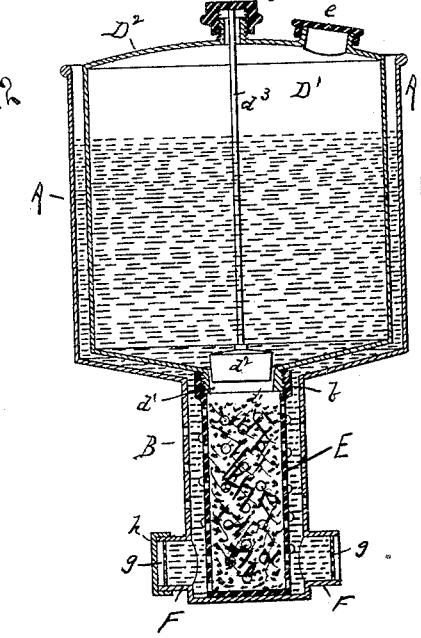
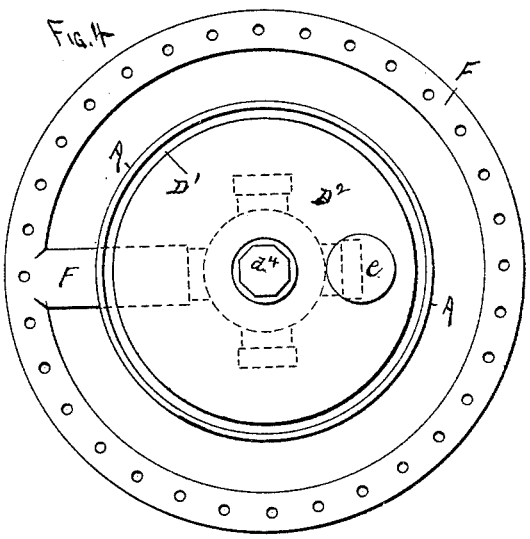
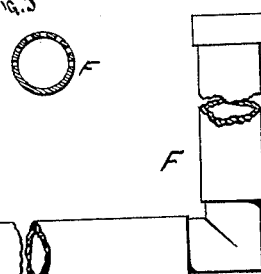
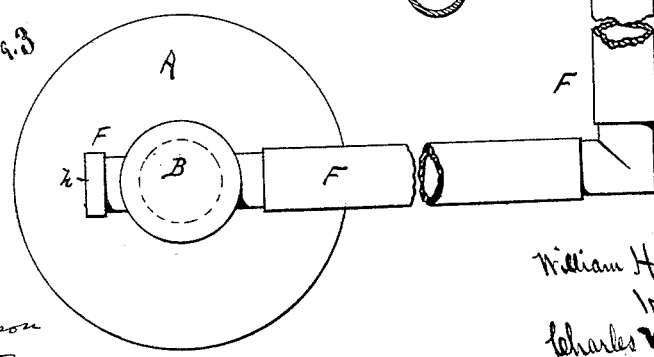
WITNESSES.
William H. Brown,
Inventor, By
Charles N. Woodward
Atty.
N. PETERS, Photo-Lithographer, Washington, D. C.

UNITED STATES PATENT OFFICE.

WILLIAM H. BROWN, OF ST. PAUL, MINNESOTA.

APPARATUS FOR TRANSMITTING FERTILIZERS.

SPECIFICATION forming part of Letters Patent No. 419,242, dated January 14, 1890.

Application filed July 15, 1889. Serial No. 317,615. (No model.)

*To all whom it may concern:*

Be it known that I, WILLIAM H. BROWN, a citizen of the United States, residing at St. Paul, in the county of Ramsey and State of Minnesota, have invented certain new and useful Improvements in Apparatus for Transmitting Fertilizing Substances to Vegetation, of which the following is a specification.

This invention relates to apparatus for transmitting fertilizing substances to vegetation; and it consists in the construction and mode of operation as hereinafter shown and described, and specifically pointed out in the claims.

In the drawings, Figure 1 is a detail view showing my apparatus applied to the roots of a tree. Fig. 2 is an enlarged sectional elevation, and Fig. 3 is a reversed plan view, of the apparatus complete. Fig. 4 is a plan view showing a slight modification in the manner of arranging the conducting-tubes. Fig. 5 is a cross-sectional view of one of the lateral conducting-pipes.

A represents an outer casing or shell, which may be of any desired form or of any suitable material, open at the top and embedded in the ground at any desired location, and with a perforated extension B projecting downward from its lower part, as shown.

D' is an inner shell adapted to fit into the outer shell A, and with a perforated extension E projecting downward into the extension B, the parts D' E conforming to and fitting into the parts A B, but with a space between them, as shown. The part E is shown secured by a screw-connection $b$ to the part D'; but it may be secured in any other suitable manner, or formed in one piece with the part D', as preferred. In the bottom of the part D', at the entrance to the part E, is a valve-seat $d'$ in which a valve $d^2$ fits, the latter adapted to be adjusted by a rod $d^3$ passing upward through the top $D^2$ and provided with a nut $d^4$, by which it may be held at any desired point.

The casing D' is intended to hold water, which is supplied to it through an aperture covered by a cap $e$, and which flows down into the extension E through the valve $d^2$. The valve will be so constructed that the amount of water flowing through it can be perfectly controlled and regulated, so that the amount of the flow may be greater or smaller, as may be required.

The part E is intended to be filled with fertilizer of some kind, generally of some solid substance—such as bone-dust, land-plaster, guano, &c.—which the water filtering through will reduce or dissolve and carry off through the perforations into the ground, where it will be absorbed by the vegetation which it is designed to fertilize. Liquid fertilizer may be also employed in the same manner, if preferred.

As before stated, the valve $d^2$ may be so set as to allow the water to run down into the receptacle E in any desired quantity, so that the fertilizer may be fed to the vegetation to any desired extent.

If the device is used in connection with a single tree, as the illustration in Fig. 1 would indicate, it will be embedded in the ground as close to the tree as possible, and one or more may be employed to each tree, if required.

When employed to fertilize lawns or extended sections of shrubbery, perforated conducting-pipes F will be connected to the lower part of the extension B and extended in any direction and to any distance desired to conduct the water to the sodding or shrubbery. The perforations in the piping F are all in the upper part, so that the lower part forms a trough or conveyer for the liquids to insure their flowing throughout the entire length of the piping. This is a very important feature of my invention, as it enables me to conduct the liquid fertilizer to any required distance and thoroughly irrigate and fertilize large tracts of soil from one central source of supply.

In Fig. 4 I have shown the piping F in the form of a ring, in which form it will be found very useful in large flower-pots or vases and in similar locations.

I do not wish to be limited to any specific form of the piping F, or to any specific size or construction of the parts, as I am aware that many forms may be employed.

The piping F may be of iron piping, earthenware, wood, terra-cotta, or any other similar or suitable material.

Diaphragms $g$ of gauze or wire-cloth will be placed in the piping F, near the extension B, so as to prevent the particles of the undissolved fertilizer passing into the piping.

Caps $h$ may be placed over the apertures to the pipes F, so that the apparatus may be employed without the piping, if required.

This device will also be found very useful for distributing water only to vegetation, which may be conducted to any desired extent of ground by means of the piping F, and the extent of the flow controlled by the valve $d^2$.

Having thus described my invention, what I claim as new is—

1. In a fertilizer-distributing apparatus, a casing adapted to be embedded in the soil and with its lower portion perforated, a tank D', having a valve $d^2$ and adapted to be inserted into said casing, substantially as and for the purpose set forth.

2. In a fertilizer-distributing apparatus, a casing adapted to be embedded in the soil, a tank D', having perforated projection E and with a valve $d^2$, and adapted to be inserted into said casing, substantially as and for the purpose set forth.

3. In a fertilizer-distributing apparatus, a casing A, adapted to be embedded in the soil, and with lateral perforated conducting-piping F connected thereto, a tank D', having valve $d^2$ and adapted to be inserted into said casing, substantially as and for the purpose set forth.

In testimony whereof I have hereunto set my hand in the presence of two subscribing witnesses.

WILLIAM H. BROWN.

Witnesses:
C. N. WOODWARD,
GEO. N. CLARK.